(12) United States Patent
Liang

(10) Patent No.: US 7,636,210 B1
(45) Date of Patent: Dec. 22, 2009

(54) OCULAR FOCUS DEVICE FOR A SIGHT

(75) Inventor: Shang-Yung Liang, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 0 days.

(21) Appl. No.: 12/417,009

(22) Filed: Apr. 2, 2009

(30) Foreign Application Priority Data

Oct. 20, 2008 (TW) ............................. 97140147 A

(51) Int. Cl.
G02B 7/02 (2006.01)
G02B 15/14 (2006.01)
G02B 23/00 (2006.01)
G03B 17/14 (2006.01)

(52) U.S. Cl. .................. 359/823; 359/825; 359/694; 359/699; 359/426; 359/428; 353/101; 396/349; 396/144; 396/529

(58) Field of Classification Search ......... 359/822–825, 359/694, 699–704, 402, 408–410, 417, 418, 359/425, 428, 431, 478, 480, 501, 502; 353/28, 353/37, 85, 97, 100, 101, 108, 119; 396/6, 396/62, 72, 79, 83, 84, 133, 141–144, 139, 396/349, 376, 460, 529; 352/140, 231, 243; 356/8, 247
See application file for complete search history.

(56) References Cited

U.S. PATENT DOCUMENTS

| | | | | |
|---|---|---|---|---|
| 2,184,351 A | * | 12/1939 | Langsner | 359/426 |
| 2,193,038 A | * | 3/1940 | Mihalyi | 396/83 |
| 2,373,052 A | * | 4/1945 | Rausch | 352/231 |
| 2,986,969 A | * | 6/1961 | Muncheryan | 359/478 |
| 3,161,716 A | * | 12/1964 | Burris et al. | 356/247 |
| 3,168,610 A | * | 2/1965 | Kende | 359/703 |
| 3,183,813 A | * | 5/1965 | Wohner et al. | 359/825 |
| 3,336,831 A | * | 8/1967 | Unertl, Jr. | 356/247 |
| 3,740,114 A | * | 6/1973 | Thompson | 359/513 |
| 4,488,787 A | * | 12/1984 | Osawa | 359/702 |
| 4,955,702 A | * | 9/1990 | Nakamura | 359/418 |
| 6,657,795 B2 | * | 12/2003 | Nishimura et al. | 359/699 |
| 7,146,097 B2 | * | 12/2006 | Kameyama | 396/133 |

* cited by examiner

*Primary Examiner*—Loha Ben
(74) *Attorney, Agent, or Firm*—Thomas, Kayden, Horstemeyer & Risley

(57) ABSTRACT

An ocular focus device. An ocular lens tube is movably disposed in an ocular housing and includes a positioning groove. An ocular lens set is disposed in the ocular lens tube. A positioning member is connected to the ocular housing and is disposed in the positioning groove. When the ocular lens tube moves with respect to the ocular housing, the ocular lens set performs a focus operation, and the positioning member moves in the positioning groove, limiting a moving range of the ocular lens tube with respect to the ocular housing.

6 Claims, 4 Drawing Sheets

20, 2008, the entirety of
OCULAR FOCUS DEVICE FOR A SIGHT

CROSS REFERENCE TO RELATED APPLICATIONS

This Application claims priority of Taiwan Patent Application No. 097140147, filed on Oct. 20, 2008, the entirety of which is incorporated by reference herein.

BACKGROUND OF THE INVENTION

1. Field of the Invention

The invention relates to an ocular focus device, and more particularly to an ocular focus device for a sight.

2. Description of the Related Art

Referring to FIG. 1 and FIG. 2, a conventional ocular focus device 1 for a sight comprises an ocular housing 10, an ocular lens tube 20, a first ocular lens 31, a second ocular lens 32, a spacing ring 40, a press ring 50, a stop ring 60, a first sealing ring 71, a second sealing ring 72, and an ocular rubber member 80.

As shown in FIG. 2, the ocular housing 10 comprises an inner threaded portion 11.

As shown in FIG. 1 and FIG. 2, the ocular lens tube 20 comprises an outer threaded portion 21, an inner threaded portion 22, a thread-void groove 23, a first receiving groove 24, and a second receiving groove 25. The outer threaded portion 21, thread-void groove 23, and second receiving groove 25 are formed on an outer surface of the ocular lens tube 20. The inner threaded portion 22 and first receiving groove 24 are formed on an inner surface of the ocular lens tube 20. The thread-void groove 23 is adjacent to the outer threaded portion 21 and is formed between the outer threaded portion 21 and the second receiving groove 25.

As shown in FIG. 1, the press ring 50 and stop ring 60 comprise an outer threaded portion 51 and an outer threaded portion 61, respectively.

The following description is directed to assembly of the ocular focus device 1.

As shown in FIG. 2, the first sealing ring 71 is fit in the first receiving groove 24 of the ocular lens tube 20. Here, the first sealing ring 71 can provide airtight and water-resistant functions. The first ocular lens 31 is then disposed in the ocular lens tube 20 and abuts the first sealing ring 71. The spacing ring 40 and second ocular lens 32 are then disposed in the ocular lens tube 20. Here, the spacing ring 40 is abutted between the first ocular lens 31 and the second ocular lens 32, fixing a separated distance therebetween. The press ring 50 is then revolved in the ocular lens tube 20 until abutting the second ocular lens 32. Here, the positions of the first ocular lens 31 and second ocular lens 32 in the ocular lens tube 20 can be fixed by the press ring 50. Then, the second sealing ring 72 is fit in the second receiving groove 25 of the ocular lens tube 20 and the ocular rubber member 80 is fit on the ocular lens tube 20. Here, the second sealing ring 72 can provide airtight and water-resistant functions and the ocular rubber member 80 can protect eyes of an operator. The stop ring 60 is then disposed in the ocular housing 10. Then, the ocular lens tube 20 is fastened in the ocular housing 10 and the stop ring 60 is fastened in the ocular lens tube 20. Here, the stop ring 60 is separated from the press ring 50.

When using the ocular focus device 1 to perform a focus operation, the operator can revolve the ocular lens tube 20, enabling the ocular lens tube 20 to rotate and move with respect to the ocular housing 10. At this point, the first ocular lens 31 and second ocular lens 32 disposed in the ocular lens tube 20 move with respect to the ocular housing 10, achieving a focus effect. Moreover, the rotating and moving range of the ocular lens tube 20 with respect to the ocular housing 10 is limited by the stop ring 60 and thread-void groove 23.

Nevertheless, the ocular focus device 1 has many drawbacks as follows. As many constituent members of the ocular focus device 1 are formed with threaded portions (such as, the inner threaded portion 11 of the ocular housing 10, the outer threaded portion 21 and inner threaded portion 22 of the ocular lens tube 20, the outer threaded portion 51 of the press ring 50, and the outer threaded portion 61 of the stop ring 60), manufacturing costs of the ocular focus device 1 are high. Moreover, as many of the constituent members of the ocular focus device 1 are formed with the threaded portions, the thickness or volume thereof cannot be reduced. Thus, overall weight and material costs of the ocular focus device 1 cannot be reduced. Additionally, as the focus operation of the ocular focus device 1 is accomplished by revolving the ocular lens tube 20, the moving speed of the ocular lens tube 20 (or the first ocular lens 31 and second ocular lens 32) with respect to the ocular housing 10 cannot match the revolving speed of the operator. Namely, the focus speed of the ocular focus device 1 is confined to a predetermined speed range.

Hence, there is a need for an ocular focus device with reduced manufacturing costs, size, and weight, increased focus speed, and enhanced operational convenience.

BRIEF SUMMARY OF THE INVENTION

A detailed description is given in the following embodiments with reference to the accompanying drawings.

An exemplary embodiment of the invention provides an ocular focus device for a sight. The ocular focus device comprises an ocular housing, an ocular lens tube, an ocular lens set, and a positioning member. The ocular lens tube is movably disposed in the ocular housing and comprises a positioning groove. The ocular lens set is disposed in the ocular lens tube. The positioning member is connected to the ocular housing and is disposed in the positioning groove. When the ocular lens tube moves with respect to the ocular housing, the ocular lens set performs a focus operation, and the positioning member moves in the positioning groove, limiting a moving range of the ocular lens tube with respect to the ocular housing.

The ocular focus device further comprises a resilient sealing ring fit on the ocular lens tube and abutted between the ocular lens tube and the ocular housing.

The ocular housing comprises a plurality of annular recessed grooves adjacent to each other. The resilient sealing ring is abutted between the ocular lens tube and one of the annular recessed grooves.

The ocular focus device further comprises a spacing ring disposed in the ocular lens tube. The ocular lens set comprises a first ocular lens and a second ocular lens. The spacing ring is abutted between the first and second ocular lenses.

The ocular focus device further comprises a press ring disposed in the ocular lens tube and abutting the first ocular lens.

The ocular focus device further comprises a first sealing ring disposed in the ocular lens tube and abutted between the first ocular lens and the press ring.

The ocular focus device further comprises a second sealing ring fit on the ocular lens tube and abutted between the ocular lens tube and the ocular housing. The positioning groove is located between the second sealing ring and the resilient sealing ring.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
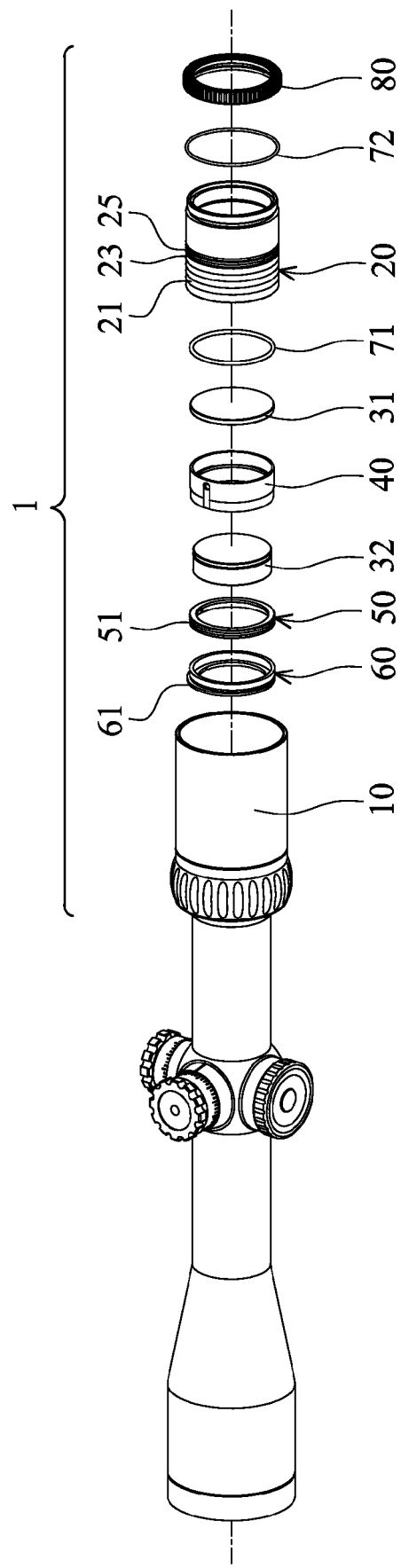
FIG. 1 is an exploded perspective view of a conventional ocular focus device.
Figure 2:
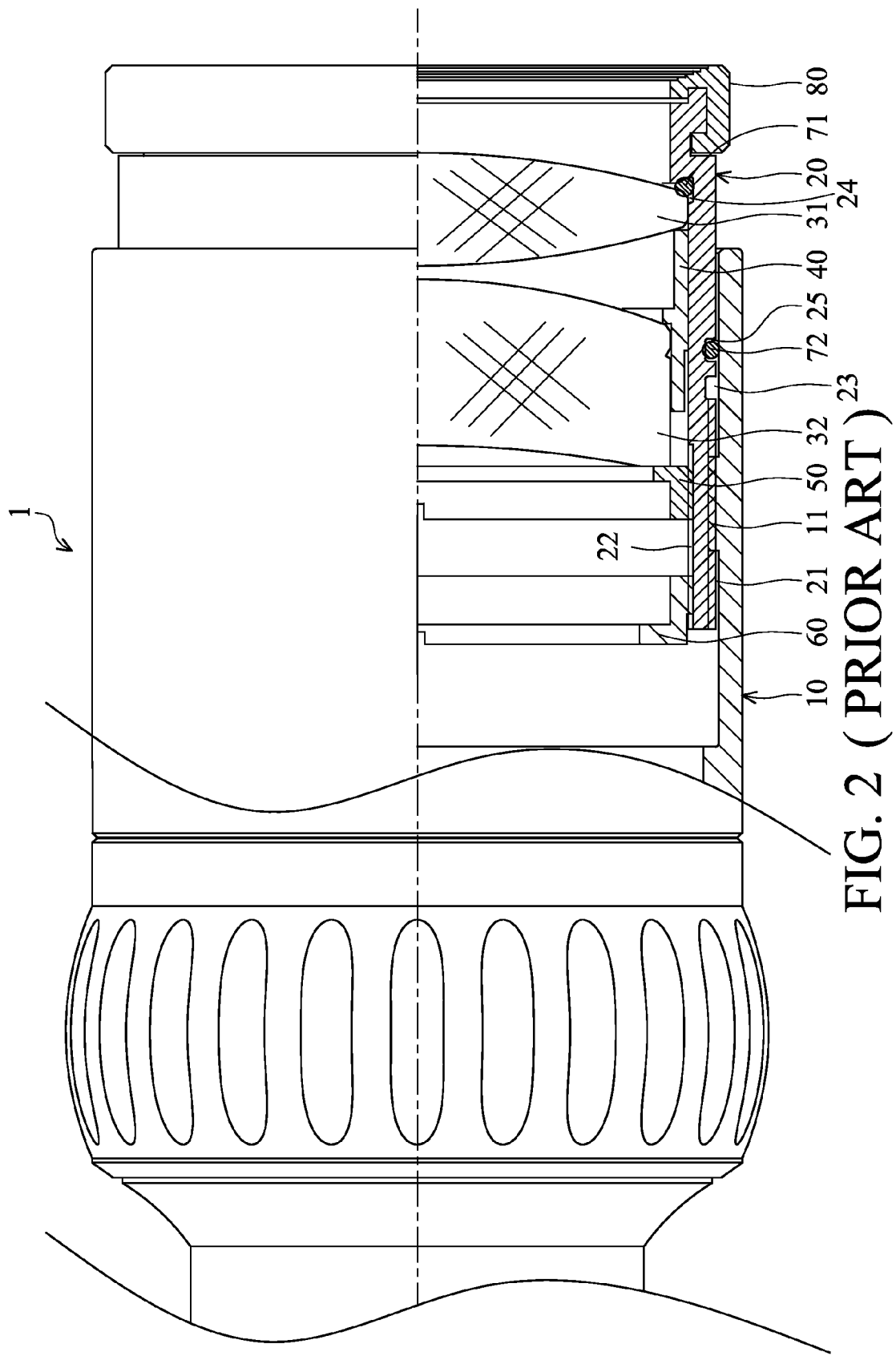
FIG. 2 is a schematic partial cross section of the conventional ocular focus device.
Figure 3:
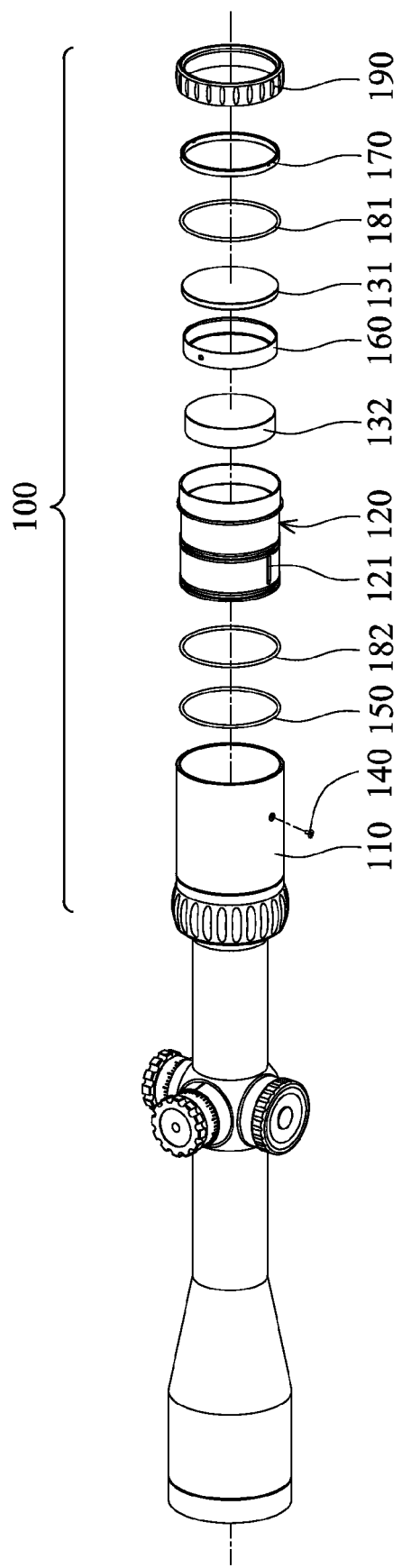
FIG. 3 is an exploded perspective view of an ocular focus device of the invention.
Figure 4:
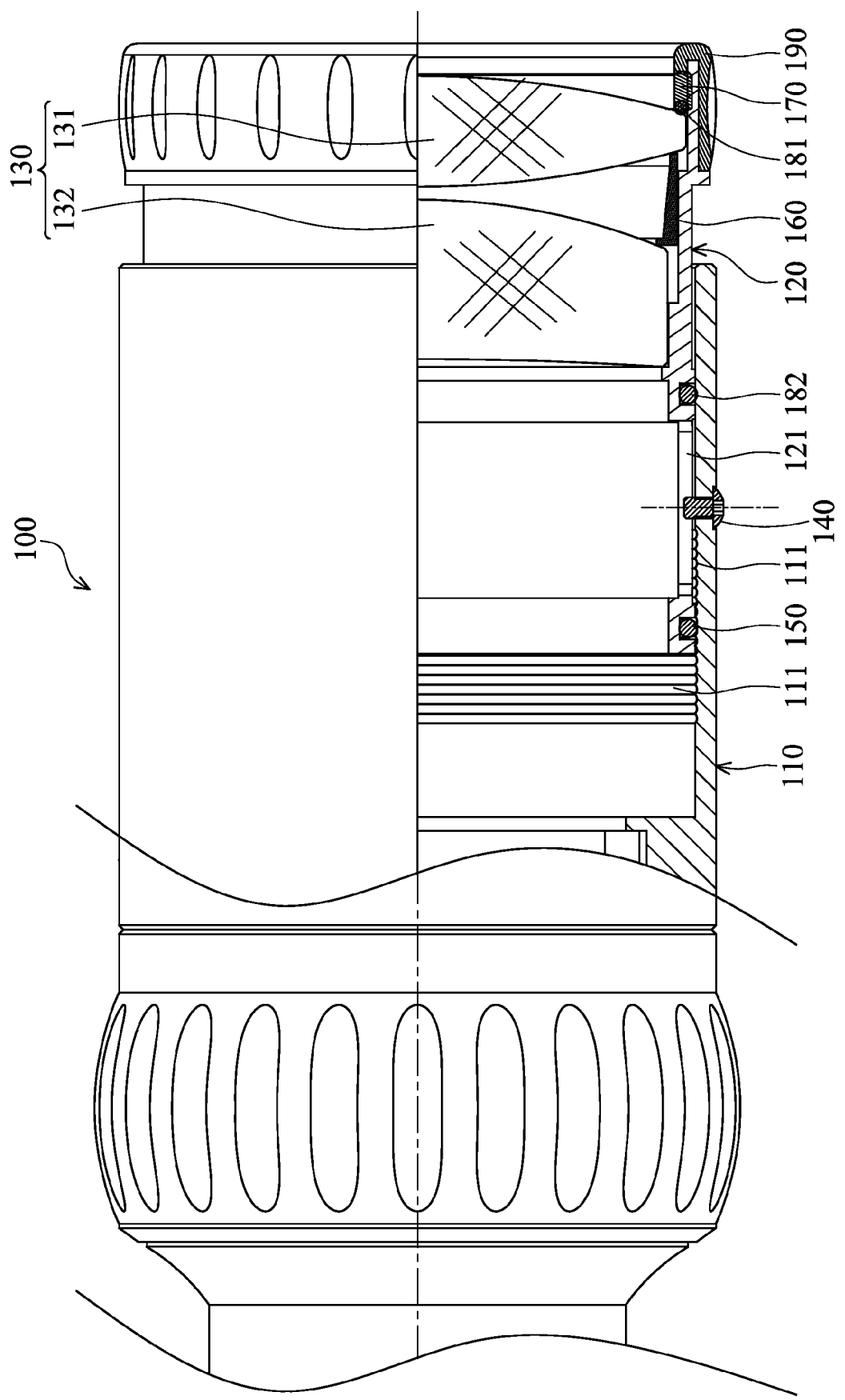
FIG. 4 is a schematic partial cross section of the ocular focus device of the invention.

Referring to FIG. 3 and FIG. 4, an ocular focus device 100 may be employed in a sight and comprises an ocular housing 110, an ocular lens tube 120, an ocular lens set 130, a positioning member 140, a resilient sealing ring 150, a spacing ring 160, a press ring 170, a first sealing ring 181, a second sealing ring 182, and an ocular rubber member 190.

As shown in FIG. 4, the ocular housing 110 comprises a plurality of annular recessed grooves 111. Here, the annular recessed grooves 111 are formed on an inner surface of the ocular housing 110 and are adjacent to each other.

As shown in FIG. 3 and FIG. 4, the ocular lens tube 120 is movably disposed in the ocular housing 110 and comprises a positioning groove 121.

The ocular lens set 130 is disposed in the ocular lens tube 120. In this embodiment, the ocular lens set 130 comprises a first ocular lens 131 and a second ocular lens 132.

The positioning member 140 is connected to the ocular housing 110 and is disposed in the positioning groove 121 of the ocular lens tube 120. Specifically, the positioning member 140 is fit in the positioning groove 121 through the ocular housing 110. In this embodiment, the positioning member 140 may be a bolt, which is fastened to the ocular housing 110 and protrudes in the positioning groove 121.

As shown in FIG. 4, the resilient sealing ring 150 is fit on the ocular lens tube 120 and is abutted between the ocular lens tube 120 and the ocular housing 110. Specifically, the resilient sealing ring 150 is abutted between (an outer surface of) the ocular lens tube 120 and one of the annular recessed grooves 111.

The spacing ring 160 is disposed in the ocular lens tube 120 and is abutted between the first ocular lens 131 and the second ocular lens 132. Here, the spacing ring 160 can fix a separated distance between the first ocular lens 131 and the second ocular lens 132.

The press ring 170 is disposed in the ocular lens tube 120 and abuts the first ocular lens 131. Here, the positions of the first ocular lens 131 and second ocular lens 132 in the ocular lens tube 120 can be fixed by the press ring 170.

The first sealing ring 181 is disposed in the ocular lens tube 120 and is abutted between the first ocular lens 131 and the press ring 170. Here, the first sealing ring 181 can provide airtight and water-resistant functions.

The second sealing ring 182 is fit on the ocular lens tube 120 and is abutted between (the outer surface of) the ocular lens tube 120 and (the inner surface of) the ocular housing 110. Similarly, the second sealing ring 182 can provide airtight and water-resistant functions. Moreover, in this embodiment, the positioning groove 121 of the ocular lens tube 120 is located between the second sealing ring 182 and the resilient sealing ring 150.

The ocular rubber member 190 is fit on an end of the ocular lens tube 120, protecting eyes of an operator.

When using the ocular focus device 100 to perform a focus operation, the operator can directly push and pull the ocular lens tube 120, enabling the ocular lens tube 120 to move with respect to the ocular housing 110. At this point, the ocular lens set 130 (first ocular lens 131 and second ocular lens 132) moves with respect to the ocular housing 110, achieving a focus effect. Moreover, when the ocular lens tube 120 moves with respect to the ocular housing 110, the positioning member 140 moves in the positioning groove 121 of the ocular lens tube 120, limiting a moving range of the ocular lens tube 120 with respect to the ocular housing 110. Specifically, during movement of the ocular lens tube 120 with respect to the ocular housing 110, the resilient sealing ring 150 with resilience slides on the annular recessed grooves 111 and is engaged in one of the annular recessed grooves 111, providing the ocular lens tube 120 with clicking and positioning effects.

Accordingly, the disclosed ocular focus device 100 has many advantages as follows. As none of the constituent members of the ocular focus device 100 is provided with threaded construction, manufacturing costs thereof are significantly reduced. Moreover, as all the constituent members of the ocular focus device 100 are provided with no threaded construction, the thickness or volume thereof can be reduced. Thus, overall weight and material costs of the ocular focus device 100 are reduced. Additionally, as the focus operation of the ocular focus device 100 is accomplished by simply pushing and pulling the ocular lens tube 120, the moving speed of the ocular lens set 130 (first ocular lens 131 and second ocular lens 132) can be increased. Namely, the focus speed of the ocular focus device 100 is increased. Furthermore, as the ocular focus device 100 provides the clicking and positioning effects for the ocular lens tube 120, operational convenience thereof can be enhanced.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An ocular focus device, comprising:
   an ocular housing;
   an ocular lens tube movably disposed in the ocular housing and comprising a positioning groove;
   an ocular lens set disposed in the ocular lens tube;
   a positioning member connected to the ocular housing and disposed in the positioning groove, wherein, when the ocular lens tube moves with respect to the ocular housing, the ocular lens set performs a focus operation, and the positioning member moves in the positioning groove, limiting a moving range of the ocular lens tube with respect to the ocular housing;
   a resilient sealing ring fit on the ocular lens tube and abutted between the ocular lens tube and the ocular housing.

2. The ocular focus device as claimed in claim 1, wherein the ocular housing comprises a plurality of annular recessed grooves adjacent to each other, and the resilient sealing ring is abutted between the ocular lens tube and one of the annular recessed grooves.

3. The ocular focus device as claimed in claim 1, further comprising a second sealing ring fit on the ocular lens tube and abutted between the ocular lens tube and the ocular housing, wherein the positioning groove is located between the second sealing ring and the resilient sealing ring.

4. An ocular focus device, comprising:
- an ocular housing;
- an ocular lens tube movably disposed in the ocular housing and comprising a positioning groove;
- an ocular lens set disposed in the ocular lens tube;
- a positioning member connected to the ocular housing and disposed in the positioning groove, wherein, when the ocular lens tube moves with respect to the ocular housing, the ocular lens set performs a focus operation, and the positioning member moves in the positioning groove, limiting a moving range of the ocular lens tube with respect to the ocular housing; and
- a spacing ring disposed in the ocular lens tube, wherein the ocular lens set comprises a first ocular lens and a second ocular lens, and the spacing ring is abutted between the first and second ocular lenses.

5. The ocular focus device as claimed in claim 4, further comprising a press ring disposed in the ocular lens tube and abutting the first ocular lens.

6. The ocular focus device as claimed in claim 5, further comprising a first sealing ring disposed in the ocular lens tube and abutted between the first ocular lens and the press ring.

* * * * *